2 Sheets—Sheet 1.
S. W. LUDLOW.
CARRIAGE-WHEEL.
No. 170,866            Patented Dec. 7, 1875.
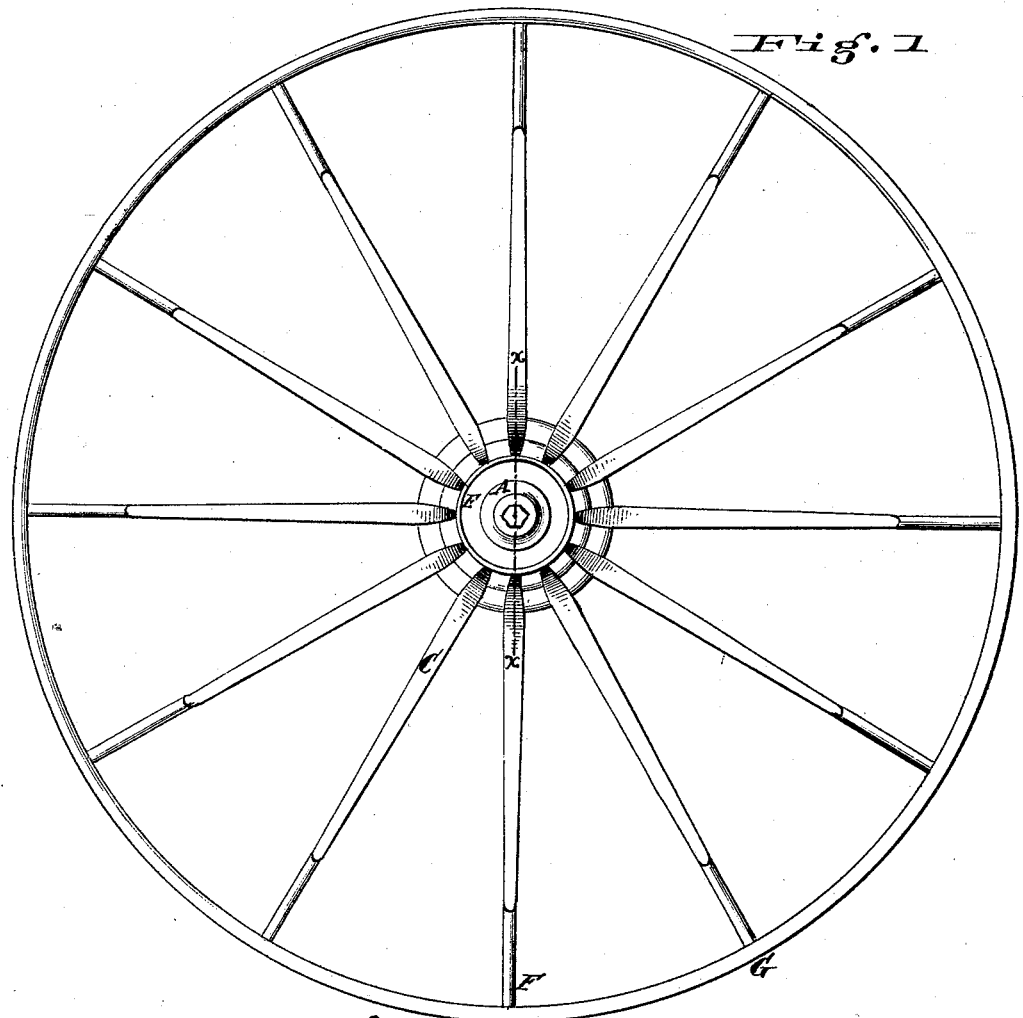
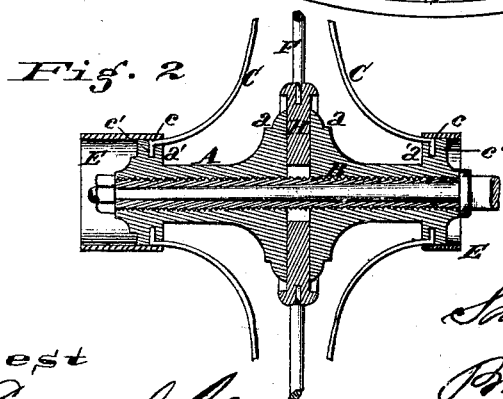
Attest
Edgar J. Gross
John E. Jones
Inventor
Saml. W. Ludlow
By F. Millward
Attorney

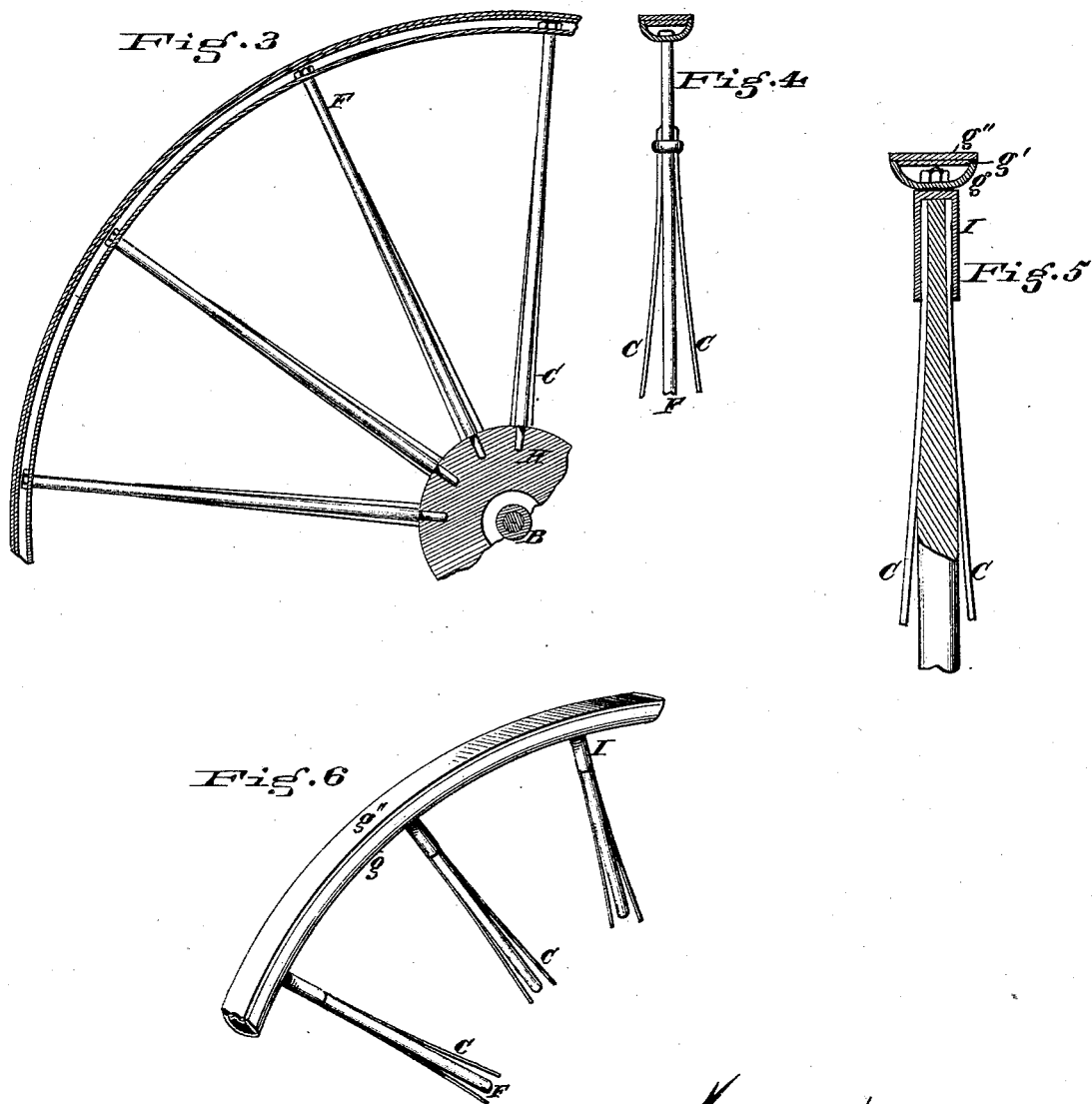

UNITED STATES PATENT OFFICE.

SAMUEL W. LUDLOW, OF CINCINNATI, OHIO.

IMPROVEMENT IN CARRIAGE-WHEELS.

Specification forming part of Letters Patent No. 170,866, dated December 7, 1875; application filed October 13, 1875.

*To all whom it may concern:*

Be it known that I, SAMUEL W. LUDLOW, of Cincinnati, Hamilton county, State of Ohio, have invented an Improvement in Carriage-Wheels, of which the following is a specification:

My invention is designed to give elasticity to a carriage-wheel in a vertical plane, to avoid or lessen the necessity of springs to the vehicle, and at the same time to provide for the successful resistance of lateral strains; and my invention consists, first, of a carriage-wheel so constructed that the frame of the wheel consists of the rim, spokes, and an annular plate, the latter arranged to play laterally between flanges on the hub, and the hub secured to the frame of the wheel, between the rim and axle, by flexible braces, so that while the weight of the vehicle will be sustained by the flexible braces, the annular parts will prevent the rim from being forced laterally by lateral strains.

My invention further consists in a certain device for securing the springs to the hubs, and in a peculiar construction of rim for the wheel.

Figure 1 is an elevation of a wheel embodying my invention. Fig. 2 is an axial section of the central portion of the same. Fig. 3 is a vertical section. Fig. 4 is a vertical cross-section; Fig. 5, a similar section, showing a modification in the manner of securing the springs; and Fig. 6, a perspective view of Fig. 5.

A is the hub of the wheel, secured in any preferred way to the axle-box B. The hub is provided with two vertical flanges, $a\ a$, at the center, and flanges or collars $a'$ at the ends. C are flexible braces or springs, having preferably bent ends $c$, fitting into corresponding pockets $c'$ in the collars $a'$. The springs are then firmly secured in these pockets by the driving on of rings E. F are the spokes of the wheel, secured to the rim G in any preferred way, and fitting into mortises in the plate H, the plate, rim, and spokes constituting the frame of the wheel. The plate H has a central aperture much larger than the axle-box, as shown, and fits snugly between the flanges $a\ a$, so that, while it is permitted to freely play vertically, it is restrained from lateral play. I make the rim G of sheet metal, of the form shown, and prefer to secure the spokes in metallic sockets I, secured by rivets or nuts to the rim, and, if necessary, the same sockets may be used to receive the ends of the braces C, as shown in Figs. 5 and 6; or the braces may be banded to the spokes, as seen in Fig. 4, or riveted into the rim at points between the spokes, or otherwise secured to the frame of the wheel at any point between the hub and rim. The rim is composed, as a whole, of curved plate $g$, inserted plate $g'$, and tire-plate $g''$, the plate $g'$ being intended to be confined in the concave, and as the plate $g''$ is fastened to it, it serves to secure the latter against lateral displacement. It is obvious that the yielding braces may be placed all upon one side of the spokes C, or upon both sides, as shown, and that they may occur as frequently as the spokes, and opposite thereto, or they may in number be more or less than the spokes, and placed, as before stated, between the spokes. They may be secured at the outer ends either to the spokes, to the rim of the wheel, or to the periphery of the plate H, the change from one position to the other requiring only a difference of curvature in the braces C.

I claim—

1. A carriage-wheel having its hub secured to it by flexible braces C, and its spokes to an annular plate, H, adapted to play laterally between the flanges of the hub, substantially as and for the purpose specified.

2. The combination of the hub A $c$, bands or rings E, and spring-braces C, the latter having bent ends $c$, fitting the pockets $c'$, substantially as and for the purpose specified.

3. The rim G, composed of plates $g\ g'\ g''$, formed and fitted together substantially as and for the purpose specified.

In testimony of which invention I hereunto set my hand.

SAMUEL W. LUDLOW.

Witnesses:
 JOHN E. JONES,
 EDGAR J. GROSS.